United States Patent [19]

Waldrop et al.

[11] 4,296,596
[45] * Oct. 27, 1981

[54] AUTOMATIC BALE EJECTION DRIVE

[75] Inventors: T. William Waldrop, New Holland; Willis R. Campbell, Ephrata, both of Pa.

[73] Assignee: Sperry Corporation, New Holland, Pa.

[ * ] Notice: The portion of the term of this patent subsequent to Jun. 24, 1997, has been disclaimed.

[21] Appl. No.: 112,600

[22] Filed: Jan. 16, 1980

Related U.S. Application Data

[62] Division of Ser. No. 25,161, Mar. 29, 1979, Pat. No. 4,208,862.

[51] Int. Cl.³ ............................................ A01D 39/00
[52] U.S. Cl. .................................................... 56/341
[58] Field of Search ................... 566/341, 344; 100/88; 414/502, 509

[56] References Cited

U.S. PATENT DOCUMENTS

| | | | |
|---|---|---|---|
| 3,189,202 | 6/1965 | Hansen | 414/502 |
| 3,722,197 | 3/1973 | Uermeer | 56/341 |
| 3,754,388 | 8/1973 | Neely, Jr. | 56/344 |
| 3,827,223 | 8/1974 | Blanshine et al. | 56/341 |
| 3,840,134 | 10/1974 | Luscombe | 414/502 |
| 3,859,909 | 1/1975 | Mast | 56/341 |
| 3,894,484 | 7/1975 | Anstry et al. | 56/341 |
| 3,901,007 | 8/1975 | Blanshine et al. | 56/341 |
| 4,143,505 | 3/1979 | Sheesley et al. | 56/341 |
| 4,208,862 | 6/1980 | Waldrop et al. | 100/88 |

Primary Examiner—Paul J. Hirsch
Attorney, Agent, or Firm—Darrell F. Marquette; Frank A. Seemar

[57] ABSTRACT

In a crop roll forming machine having a reversibly rotatable bale forming means and a drive means there is provided a control means affixed to the frame movable between at least a first position and a second position for cooperative interaction with the drive means and the bale forming means to selectively cause the bale forming means to cease being driven in a first direction and cause it to be driven in an opposing second direction when the control means is moved from the first position to the second position so that a completed crop roll is ejected rearwardly from the machine onto the ground.

6 Claims, 12 Drawing Figures

AUTOMATIC BALE EJECTION DRIVE

This is a division, of application Ser. No. 025,161, filed Mar. 29, 1979 now U.S. Pat. No. 4,208,862.

BACKGROUND OF THE INVENTION

This invention relates to a machine for forming large cylindrical bales of crop material, commonly called round bales, in a roll forming region above the ground. More specifically, it is concerned with apparatus which permits the completed bale to be discharged from the roll forming region onto the ground by the automatic reversing of the bale forming means or upper apron.

Historically, it has been the custom to harvest forage crops by mowing the particular crop, letting it dry in the field, forming the dried crop material into windrows and passing a hay-baling machine over and along these windrows to form the crop material into rectangular bales. Recent practice has shown that the formation of crop material into large compact rolls, rather than rectangular bales as formerly done, permits the crop material to be deposited in roll form and left in fields for extended periods of time. The ability to leave these rolled bales in fields obviates the additional steps required in the traditional rectangular baling process of gathering the bales and transporting them to a storage area protected from the elements. This new technique of forming large round bales has created a baling system that can be conducted by one person. This is in marked contrast to the traditional practice of forming rectangular bales where the labor of several people was required to effect the cutting, drying, windrowing, baling, gathering and storing of the crop material.

Several methods of forming compact cylindrical rolls of crop material have evolved through the years. The most successful of these methods involves the forming of crop rolls by picking up a swath or windrow of material from the field and directing it onto a lower conveyor. This conveyor transports the material to a roll or bale forming region where an upper apron or flight of belts, usually positioned above and adjacent the conveyor, moves in a suitable direction to rotate the crop material with which it is brought into contact. The increasing popularity of these crop roll forming machines has seen their use broaden from rolling wintering forage for livestock to rolling high protein crops, such as alfalfa, for dairy livestock. Therefore, these machines are the focal point of many ideas for developing both labor-saving and time-saving apparatus.

Crop roll forming machines that produce large cylindrical crop rolls utilize some form of a tailgate which is pivotally mounted to the frame of the machine. The tailgate is elevated upon completion of the crop roll or when it is desired to discharge a less than full size bale for any of a variety of reasons from the roll forming region. The tailgate follows a predetermined arc of travel, generally pivoting about a fixed point on the frame.

Prior crop roll forming machines require the operator, who is located in the operator's area of a prime moving vehicle, such as a tractor, to perform a series of manual operations after completing the formation of the large crop roll and prior to recommencing the roll forming process or cycle. Generally these manual steps require the stopping of the roll forming machine and the towing tractor, the initiation of the wrapping of the completed crop roll, stopping the power takeoff shaft from the tractor, opening the tailgate, restarting the power takeoff shaft to power the roll forming machine's components to assist in discharging the bale, closing the tailgate and finally, restarting the forward motion of the tractor and the roll forming machine. Obviously, one way to save time is to reduce the number of manual steps which the roll forming machine operator must take after the completion of the formation of each bale.

The current commercial crop roll forming machines generally discharge the completed crop material package from the roll forming region either by pivoting the tailgate rearwardly and upwardly, thereby permitting the bale to drop directly onto the ground, or by first elevating the tailgate and then activating the conveyor lower apron which forms the lower limit of the roll forming region. In the latter case, the lower apron is activated by the operator's restarting the power takeoff shaft, which previously has been disengaged, thereby causing the bale to be urged rearwardly out of the machine and onto the ground. In both cases, since these large cylindrical compact bales can vary in weight from as much as 850 to 1500 pounds or more, quite frequently a bale comes to rest at a position which is within the arc followed by the tailgate when it travels from its open or raised position to its closed or shut position. This means that for both techniques of discharging a completed bale the discharged bale can interfere with the tailgate as it is closed prior to the machine's continuing across the field and initiating the rolling of another bale. In addition then to requiring the operator to take certain manual steps every time a completed bale is to be discharged, there is the additional time consuming possibility that the roll forming machine will have to be pulled forward so that the tailgate can close without having the completed crop roll interfere with its arcuate path of travel.

The foregoing problems are solved in the design of the machine comprising the present machine by providing drive means for discharging the completed crop roll automatically with the raising motion of the tailgate. The drive means impart a sufficiently powerful ejective thrust to the completed crop bale as it exits the roll forming region to enable it to generally roll clear of the arcuate path of travel followed by the tailgate as it closes. More importantly, the power takeoff shaft may continuously be operated during the entire bale discharging sequence, thereby obviating the necessity for the time consuming steps of cutting off the power takeoff shaft drive and then reengaging it prior to discharge of the completed bale and the recommencing of the roll forming process.

SUMMARY OF THE INVENTION

It is an object of the present invention to provide in a crop roll forming machine apparatus that automatically will discharge a completed crop roll from the bale forming region and which is activated by the raising of the tailgate.

It is a feature of the present invention to provide a drive system for a roll forming machine which cooperates with the movement of the tailgate so that at a preselected point the bale forming means automatically ceases its rotation in a first direction and at another predetermined point in the movement of the tailgate reverses its rotation to eject the completed crop roll.

It is a further feature of this invention that the power takeoff shaft or rotary power shaft coming from the prime moving or towing vehicle need not be stopped during the bale forming and ejecting cycle.

It is an advantage of the present invention that a completed crop roll is positively ejected out the rear of the roll forming machine from the bale forming region by the action of the bale forming means imparting topspin to the crop roll by the reversal in direction of travel of the bale forming means, thereby permitting the roll to exit the machine with sufficient force to permit it to come to rest beyond the path of the closing tailgate.

It is an additional advantage of the present invention that the lower apron or lower conveyor is automatically declutched in conjunction with the movement of the tailgate upwardly.

It is a further advantage of the instant invention that the amount of manual participation by the roll forming machine operator is significantly reduced and the total amount of time necessary to discharge a completed crop roll and recommence the forming of an additional bale is substantially decreased.

These and other objects and advantages are obtained by providing in a crop roll forming machine adapted to be towed across a field control means affixed to the frame movable between at least a first position and a second position for cooperative interaction with the drive means and the reversibly rotatable bale forming means to selectively cause the bale forming means to cease being driven in a first direction and cause it to be driven in an opposing second direction when the control means is moved from the first position to the second position so that a completed crop roll is ejected rearwardly from the roll forming machine onto the ground.

BRIEF DESCRIPTION OF THE DRAWINGS

The advantages of this invention will become apparent upon consideration of the following detailed disclosure of the invention, especially when it is taken in conjunction with the drawings wherein:

FIG. 11 is an enlarged side elevational view of another embodiment of the drive means of the crop roll forming machine showing its components positioned in phantom corresponding to the tailgate's positioning in FIG. 2 in the raised position and in solid lines corresponding to the tailgate's positioning in FIG. 1 in the closed position.

DETAILED DESCRIPTION OF THE PREFERRED EMBODIMENT

Figure 1:
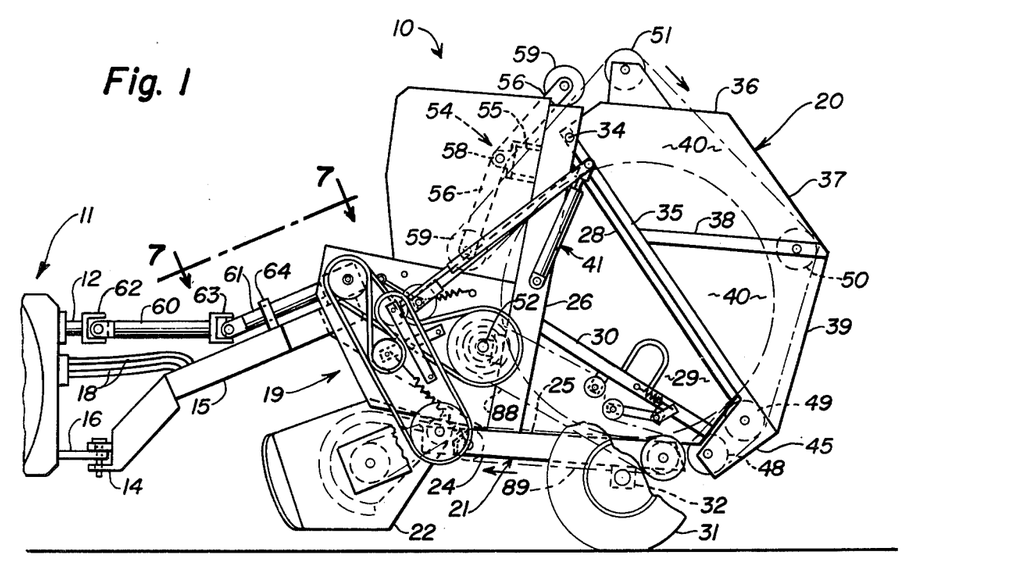
FIG. 1 is a side elevational view of a crop roll forming machine attached to a partially illustrated tractor for towing and having the side shielding broken away to show one type of drive means for the upper apron.

Referring generally to the drawings and in particular to FIG. 1, there is shown a general representation of the crop roll forming machine 10 of the type illustrated in U.S. Pat. No. 3,859,909 to Mast, dated Jan. 14, 1975. The crop roll forming machine 10 is illustrated as being fastened to a towing vehicle such as a tractor 11 with a power takeoff shaft 12 providing the rotary driving force for the mechanically operated components of the crop roll forming machine. The machine 10 is appropriately fastened via the towing hitch 14 mounted on the draft member 15 of the roll forming machine 10 to hitch member 16 of the tractor 11. The tractor hydraulic lines 18 provide the necessary fluid from the tractor's hydraulic reservoir (not shown) for the hydraulically operated components of the roll forming machine 10. The drive means for the roll forming machine 10 is indicated generally by the numeral 19.

Figure 2:
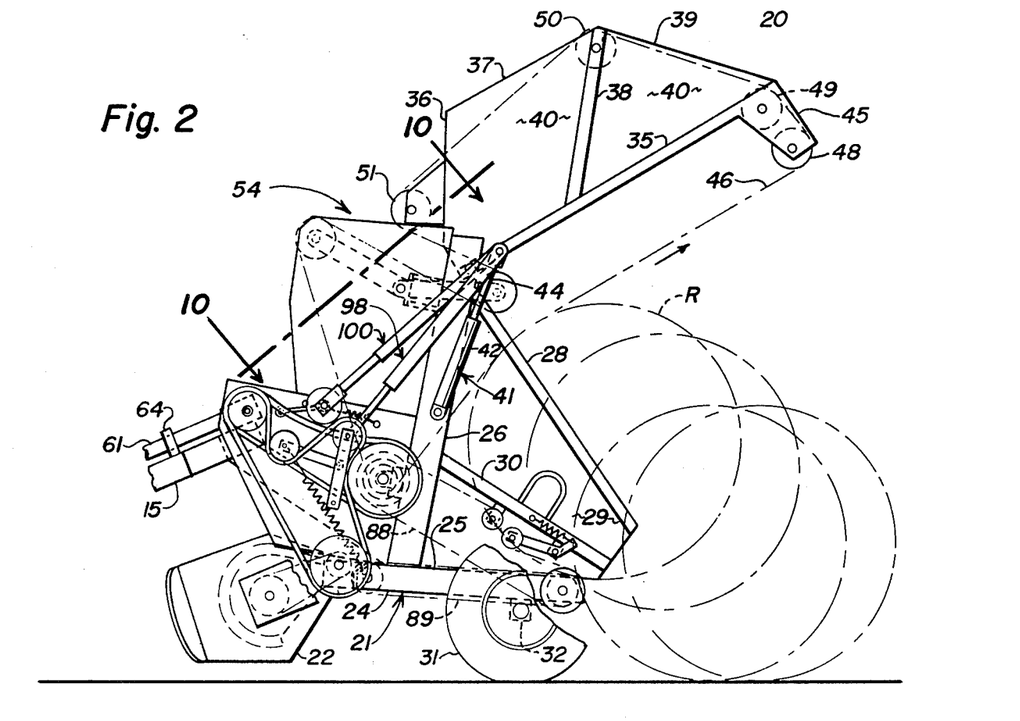
FIG. 2 is a side elevational view of the roll forming machine with the tailgate in the raised position diagrammatically illustrating the ejection of a completed bale or crop roll R and the relative positioning of the components of one type of drive means used to effect the reverse movement of the upper apron.
Figure 2:
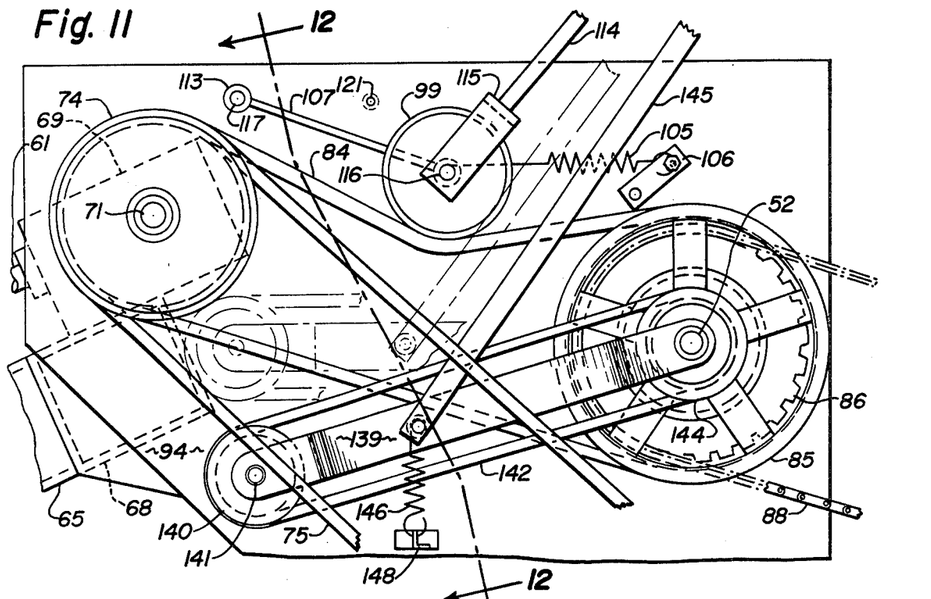

The roll forming machine 10, shown in FIGS. 1 and 2, comprises generally an upper frame 20 and a lower frame 21. Lower frame 21 has mounted to its forward portion a pickup 22, normally tined, for collecting crop material deposited in preformed windrows on a field and delivering it to the roll forming machine 10. The lower frame 21 includes a horizontal beam member 24 to which is suitably fastened a floor 25. The floor 25 alternatively may be in the form of sheet metal with appropriate channels (not shown) having conveying chains running therealong, as illustrated in the aforementioned patent to Mast, or may consist of one conveyor belt rotatably mounted or any other means suitable for supporting crop material once it is delivered thereto by the pickup 22. Horizontal beam member 24 is connected at its forward end to a generally vertical beam member 26. A diagonal brace member 28 is appropriately fastened to the top of vertical beam member 26 and extends downwardly and rearwardly until it joins fixedly with a bracing member at the rearward portion of the side sheet covering member 29. A diagonal bracing member 30 extends upwardly and forwardly from the rear of side sheet covering member 29 until it is fixedly fastened to vertical member 26. This lower frame 21 is mobilely mounted to a pair of wheels 31 (only one of which is partially shown) via a suitable axle and support beam indicated generally by the numeral 32.

Upper frame 20, shown in its elevated position in FIG. 2 consists of a tailgate pivotable about its mounting point 34 at the top of vertical member 26. The tailgate or upper frame 20 is formed from a series of interconnected bracing members 35,36,37,38 and 39 and is encased by side sheet members 40 and rear sheet members (not shown). The upper frame 20 is raised and lowered by means of a pair of hydraulic cylinders 41, only one of which is shown. As best seen in FIG. 2, the hydraulic cylinders 41 are mounted one on each side of the frame with the barrel end 42 being fastened to the vertical beam member 26 of the lower frame 21 and the rod end 44 being fastened to the bracing member 35 of the upper frame 20. Suitable hydraulic lines (not shown) are connected to opposite ends of the cylinders 41 to supply the fluid from the aforementioned tractor hydraulic reservoir for the selective activation of the hydraulic cylinders. As best seen in the elevated position of FIG. 2, the upper frame has an elongated section 45 of the type shown and described in U.S. Pat. No. 4,143,505, assigned to the assignee of the present invention.

The upper bale forming means or upper apron 46 travels about the periphery of the roll forming machine 10 on a series of appropriately mounted idler sprockets 48,49,50,51 and a drive sprocket (not shown) mounted about a reversible rotatable shaft 52. Shaft 52 is suitably rotatably affixed or mounted to vertical frame member 26. A takeup mechanism indicated generally by the numeral 54 is fastened to bearing brackets 55, shown in FIG. 1 which are in turn secured to the upper portion of vertical member 26. The takeup mechanism 54 further includes a pair of pivotable parallel arms 56, one being positioned on each side of the frame. The takeup mechanism pivots about a bearing 58 and thereby allows the upper apron 46 to be played out and about the periphery of expanding crop roll R. The upper apron 46 passes about sprockets 59 mounted on the end of each of the takeup arms 56. The upper apron 46 is preferably comprised of a pair of roller link chains (not shown) transversely spaced apart on opposing sides of the machine 10 which are interconnected by a series of spaced apart parallel crop engaging members which combine with the roller link chains to form a rotatable curvilinear crop engaging surface.

The details of the roll forming machine are not described in further detail at this point because they are old and well known to one of ordinary skill in the art. It should be noted, however for the purpose of the invention to be described hereinafter, that the upper apron 46 could equally well comprise the aforementioned roller link chains, as well as a series of expandable belts or a series of rollers of cylindrical or hexagonal cross section arranged to form a movable curvilinear surface.

Figure 7:
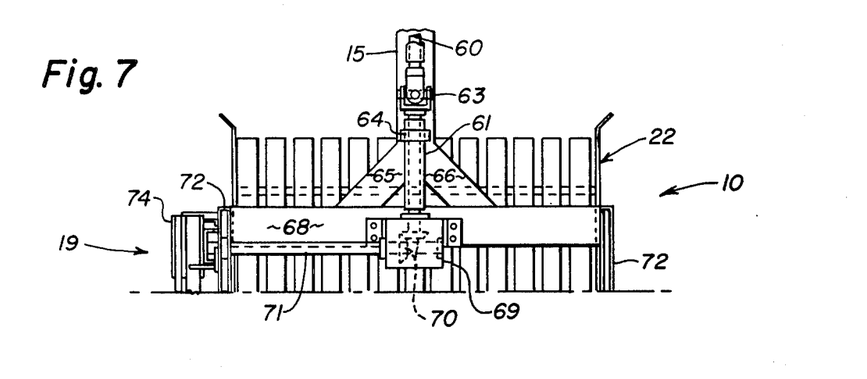
FIG. 7 is a sectional view taken along the lines 7—7 of FIG. 1 showing the input power takeoff shaft and the main drive shaft coming from a gearbox on the roll forming machine leading to the drive means.

Drive means 19 is connected to the power takeoff shaft 12 of FIG. 1 of the tractor 11 through a series of connecting shafts and gearboxes best shown in FIG. 7. Connecting shaft 60 connects to the shaft 12 of FIG. 1 at a universal joint 62 above draft member 15. Shaft 60 then joins input shaft 61 via another universal joint 63. Input shaft 61 is rotatably fastened to draft member 15 via support bracket 64, best shown in FIGS. 1 and 2. Rearwardly of bracket 64 draft member 15 separates into two members 65 and 66 to generally form an A-frame type of structure. Members 65 and 66 are fixedly fastened to a horizontal support member 68, best shown in FIG. 7, which extends transversely across the width of the roll forming machine 10. Input shaft 61 then is joined with a right angle gearbox 69 suitably fastened atop horizontal member 68. The rotary power is transferred within gearbox 69 through a set of bevel gears 70 to an output shaft 71. Shaft 71 extends through side member 72 and at its extremity has mounted thereabout a multi-grooved drive sheave 74. The sheave 74 and output shaft 71 are enabled, as a result of the instant invention, to be continuously driven during the operation of the roll forming machine 10 without disengaging the shaft 12. The rotary power being transferred from the power takeoff shaft 12 through the gearbox 69 to the sheave 74 is transferred via drive belt 75 to sheave 76 and then to shaft 78 about which sheave 76 is mounted.

Figure 3:
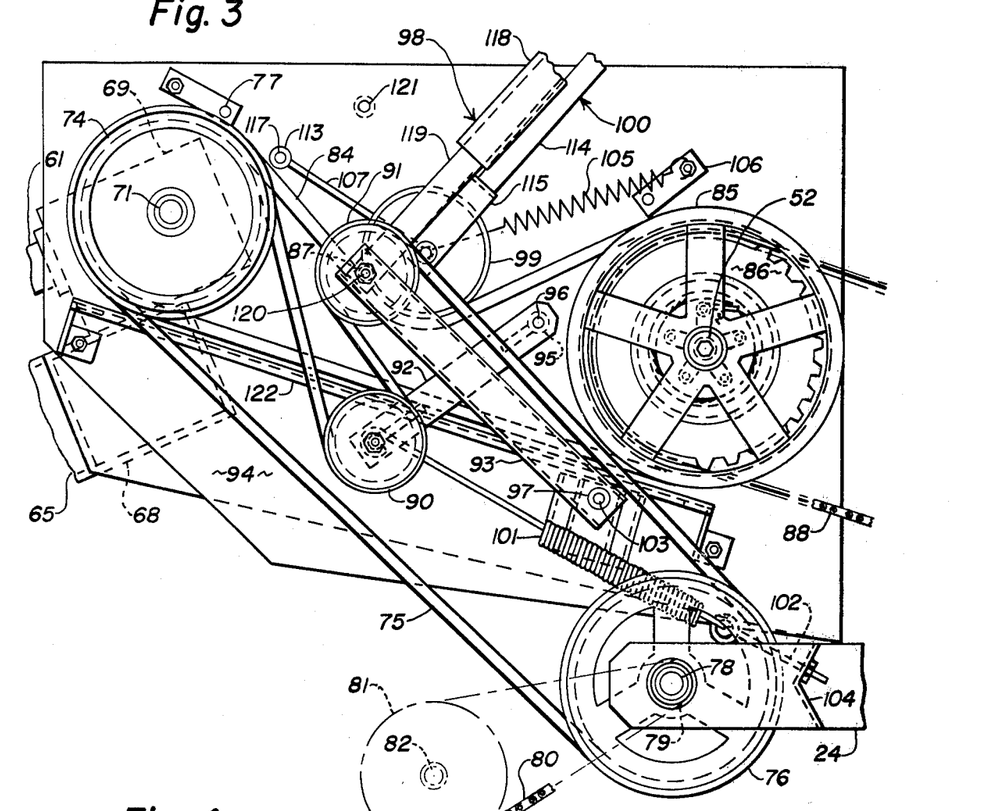
FIG. 3 is an enlarged side elevational view of the drive means of the crop roll forming machine corresponding to the components' positioning in FIG. 1 with the tailgate closed and the bale being formed.
Figure 4:
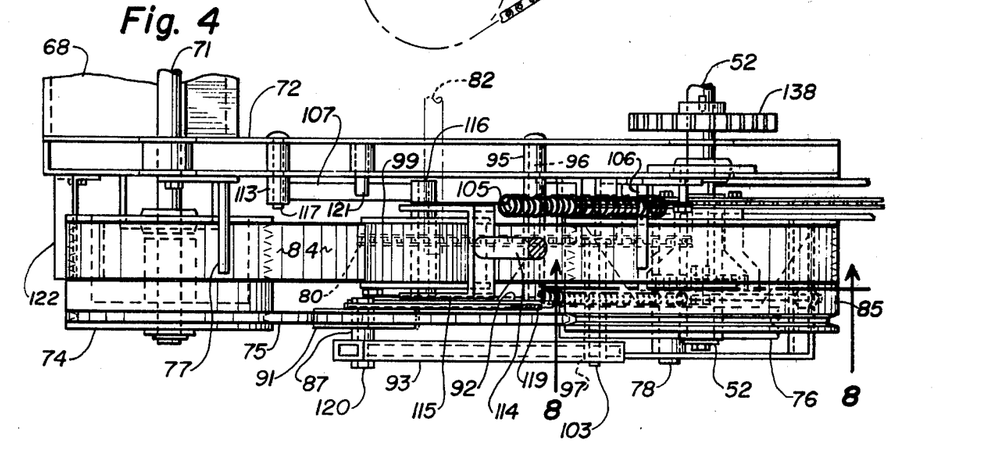
FIG. 4 is a top plan view of the drive means and its components corresponding to their positioning in FIG. 1.
Figure 5:
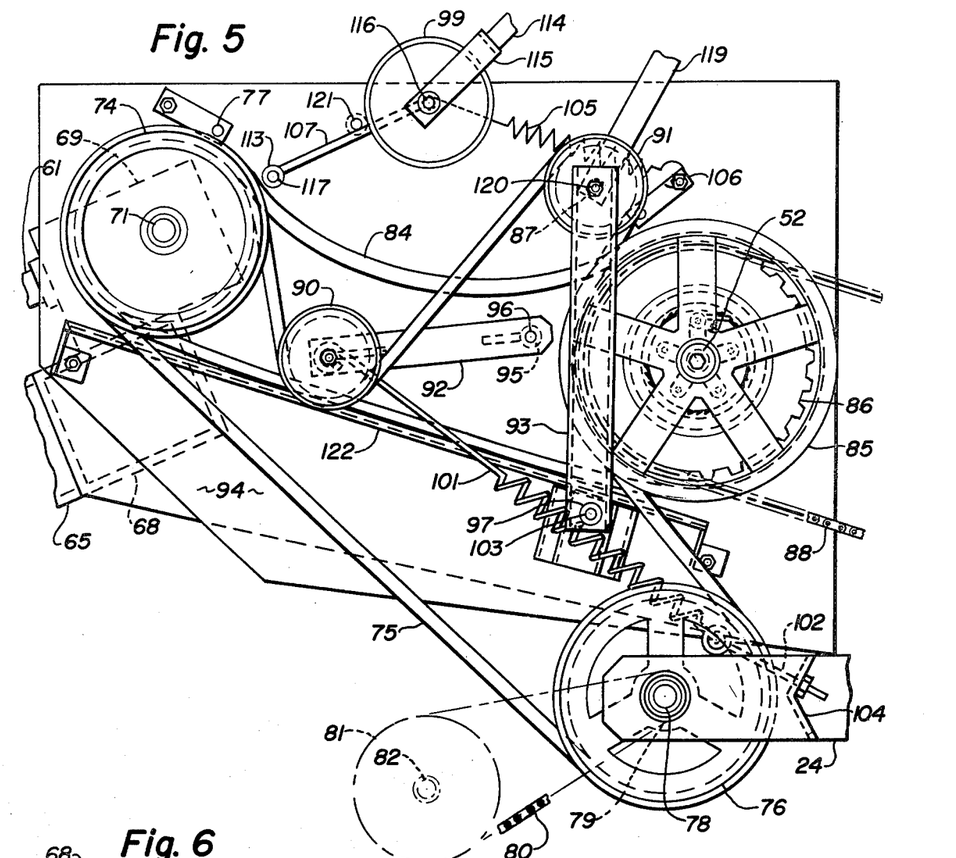
FIG. 5 is an enlarged side elevational view of the drive means of the crop roll forming machine with its components positioned corresponding to the positioning shown in FIG. 2 when the tailgate is raised effective to reverse the path of travel of the upper apron and eject a bale.
Figure 6:
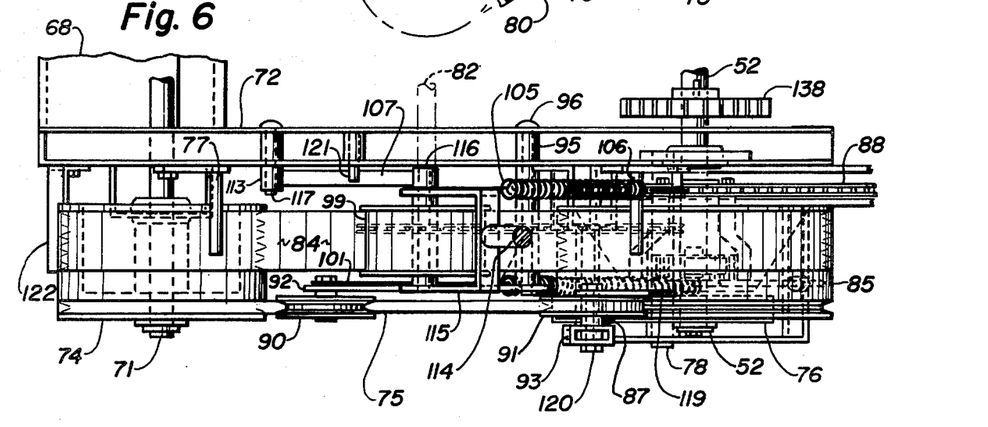
FIG. 6 is a top plan view of the drive means of FIG. 5 with its components positioned to reverse the path of travel of the upper apron.

The transfer of rotary power is best seen in FIGS. 3 and 5 wherein in enlarged scale the drive means 19 is first shown with the components in position to drive the upper apron 46 in a first direction utilized during the formation of a bale end; secondly, in position to drive upper apron 46 in an opposing second direction utilized during the discharge of the bale, respectively. Interiorly of the sheave 76 shaft 78 has a sprocket 79 mounted thereabout which is connected via chain 80 to driven pickup sprocket 81 which is mounted about pickup drive shaft 82. Shaft 82 then drives the tined pickup 22 which is pivotally mounted to the lower frame 21 of FIGS. 1 and 2.

Drive sheave 74 also has a second driving belt 84 mounted thereabout interiorly of the drive belt 75. Belt 84 is wrapped about multiply grooved driving sheave 85 which is mounted about reversibly driven shaft 52 and which drives the upper apron 46. Brackets 77 and 106 have belt guide pins extending outwardly over sheaves 74 and 85, respectively, which aid in keeping belt 84 properly seated about its sheaves. Interiorly of multiply grooved sheave 85 and coaxially mounted about shaft 52 is a sprocket 86 about which is wrapped a chain 88. Chain 88 drives the lower apron 89, illustrated in phantom in FIGS. 1 and 2.

Drive belt 75 and driving belt 84 are maintained with the proper amount of tension to transmit rotary power from output shaft 71 via drive sheave 74 to both sheave 76 and multiply grooved sheave 85 by means of a series of movable tensioning idlers. The relationship of these idlers to belts 75 and 84 during the roll forming cycle and the roll ejection cycle are shown in FIGS. 3 and 5, respectively. Drive belt 75 is tensioned by a pair of rotatable idlers 90 and 91 which are movable separately with respect to each other. Idler 90 is rotatably mounted to arm 92 which is pivotally affixed to side sheet member 94 via bushing 95 and pin 96. Idler 91 is fastened to an extensible support arm attached at the upper end to the tailgate 20 (not shown in FIGS. 3 and 5) and is indicated generally by the numeral 98. A connecting link 93 is pivotally affixed to side sheet member 94 by bushing 97 and pin 103. On its opposing end link 93 rotatably supports idler 91 by bushing 87 and pin 120. Driving belt 84 is tensioned by movable idler 99 which is rotatably affixed to a second extensible support arm also attached at its upper end to the tailgate 20 and indicated generally by the numeral 100. Idler 90 is spring biased via spring 101 which is fastened via a suitable clevis 102 mounted to bracket 104. Bracket 104 is fixedly fastened to horizontal beam member 24. Spring 101 serves to keep belt 75 under the proper amount of tension to transmit rotary drive power when the upper frame or tailgate 20 is in the closed position and a crop roll R is being formed within the machine in a region commonly known as the bale forming region. Spring 105, anchored on one end to bracket 106, serves to relieve the tension on belt 84 by lifting idler 99 as the tailgate 20 is elevated beyond a predetermined point in its arcuate path to the raised or open position.

Figure 10:
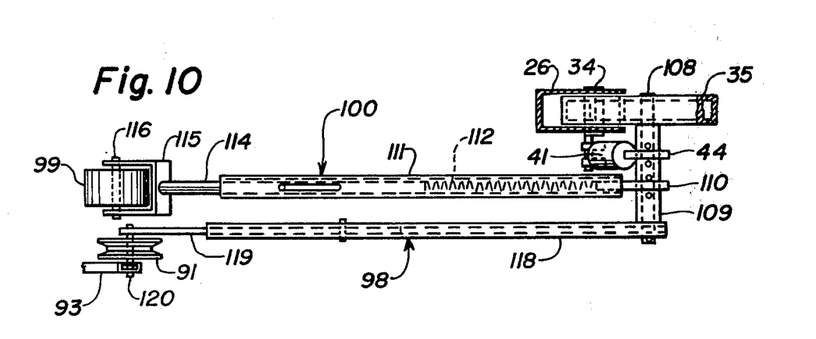
FIG. 10 is a sectional view taken along the lines 10—10 of FIG. 2 illustrating the lifting means for the tailgate of the crop roll forming machine and its cooperative functioning with the tensioning or idler means utilized to effect the reversing of the upper apron.

Extensible support arms 98 and 100 are shown in more detail in FIG. 10. Arm 100 is fastened at its upper end to bracing member 35 of the upper frame or tailgate 20 by a stub pin 108 and bushing 109, both of which are inserted through a suitably sized opening in coupling extension 110. Support arm 100 has an upper base member 111 with a spring 112 inserted within its hollow upper portion. The opposing end of arm 100 has inserted therein a telescoping portion 114 which has at its lower end a bracket 115 suitably fastened thereto. Idler 99 is rotatably mounted about roller pin 116 which passes through the legs of bracket 115. Spring 112 serves to keep sufficient tension via idler 99 on belt 84 to permit the transfer of rotary drive power when the tailgate 20 is in the closed position. Support arm 98 similarly is mounted about pin 108 and bushing 109 at the upper portion of the base member 118. Inserted within the hollowed lower end of base member 118 is the telescoping portion 119. The lower portion of telescoping member 119 has a roller pin 120 fixed thereto and about which idler 91 is rotatably mounted. The most exterior or outboard end of roller pin 120 has connecting link 93 affixed thereto. The telescoping portions of support arms 98 and 100 are movable within base members 118 and 111, respectively, to permit some lost motion to occur in the movement of the idlers 91 and 99 as the tailgate is raised. This permits the required amount of tension to be maintained on the belts 75 and 84 until certain predetermined points in the elevational path of the tailgate are reached. The arcuate movement of the tailgate, in conjunction with spring 105, causes the idler 99 to be sufficiently raised to reduce the required tension to interrupt the transfer of the rotary drive power of belt 84. Belt 75 is continuously maintained under tension as the tailgate 20 is raised by the cooperative pivotal effect of idlers 90 and 91 and spring 101 so that rotary driving force is continuously transferred from sheave 74 to sheave 76. As the tailgate continues to be raised towards its fully extended position, a second predetermined point is reached where the arm 98 is in a position which causes the idler 91 to pull the drive belt 75 sufficiently upwardly and rearwardly that it back wraps about multiply grooved sheave 85. The combined cooperative effect of idlers 90,91, spring 101 and arm 98 creates greater tension on the back wrapped drive belt 75 when the tailgate is in the raised position than when it is in the lowered or closed position. The effect of this back wrapping will be further explained hereinafter.

A stop pin 121 is fastened to and extends outwardly from side sheet member 94 to engage a pivot arm 107, thereby limiting the amount of upward rotational movement of idler 99 when the tailgate is in the raised position. A support shelf 122 is suitably affixed to side sheet member 94 to support the lower run of driving belt 84 when the tailgate is raised beyond the predetermined point that removes the tension from driving belt 84 to interrupt the transfer of rotary power between the drive sheave 74 and multiply grooved sheave 85.

FIG. 11 shows an alternative embodiment of the drive means indicated generally by the numeral 19 in FIG. 1. The rotary power is transferred to shaft 71 and then to sheaves 74 and 85 via driving belt 84 as explained previously. In this embodiment, however, drive belt 75 is connected directly to sheave 76 (not shown) without the use of any intermediate idlers. Driving belt 84 is tensioned by idler 99 fastened to the tailgate in the manner previously described. Shaft 52 has a support arm 139 pivotally mounted thereabout. On its opposing end support arm 139 has rotatably mounted a sheave 140 mounted about a roller pin 141. Belt 142 passes about sheave 140 on the freely moving end of support arm 139 and a sheave 144 on the opposing pivoting base end. Support arm 139 is movably affixed to lifting arm 145 at a point suitably located along its length. Lifting arm 145 is fastened to the tailgate about stub pin 108 (not shown) coaxially with extensible support arms 100 (not shown) and hydraulic cylinder 41 (not shown). This mounting relationship is essentially as illustrated in FIG. 10 with the exception of lifting arm 145 and its accompanying elements replacing extensible arm 98 and its elements. Support arm 139 and lifting arm 145 are biased downwardly by spring 146 which is fastened via bracket 148 to side sheet member 94.

Figure 12:
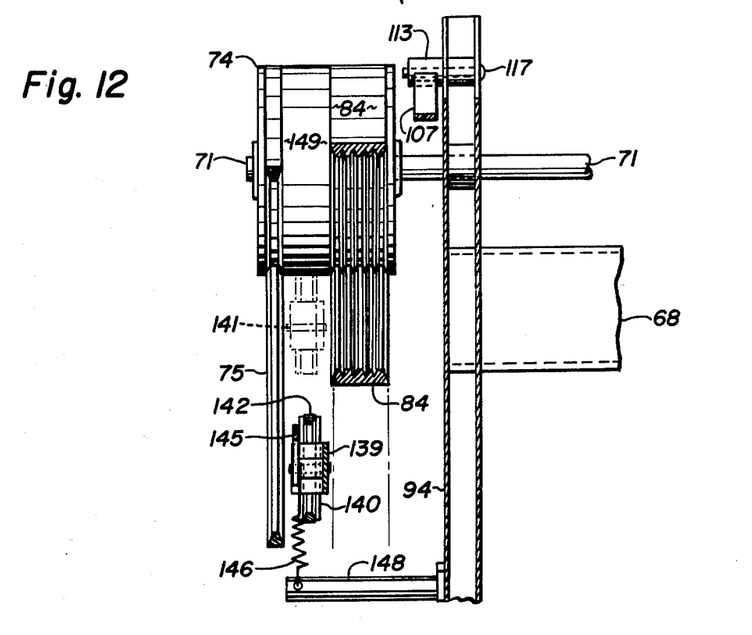
FIG. 12 is a sectional view taken along the lines 12—12 of FIG. 11 showing the relative lateral positioning of the drive means components of the embodiment in FIG. 11.

Sheave 140 on the pivoting end of support arm 139 is designed to contact the cast iron frictional extended surface 149 of sheave 74, as shown in FIG. 12. Preferably sheave 140 has rubber coated flanged sides or cylindrical tire-type edge extensions which would increase the friction between the engaging surfaces of the sheaves 140 and 74 to promote the transfer of rotary power when the lifting arm 145 is raised by the upward motion of the tailgate 20. The raising of arm 145 causes support arm 139 to pivot upwardly and bring the sheave 140 and its coworking belt 142 into contact with the surface 149 of sheave 74. If desired, a lost motion design, such as that shown in extensible support arm 100 in FIG. 10, could be utilized in lifting arm 145.

Figure 8:
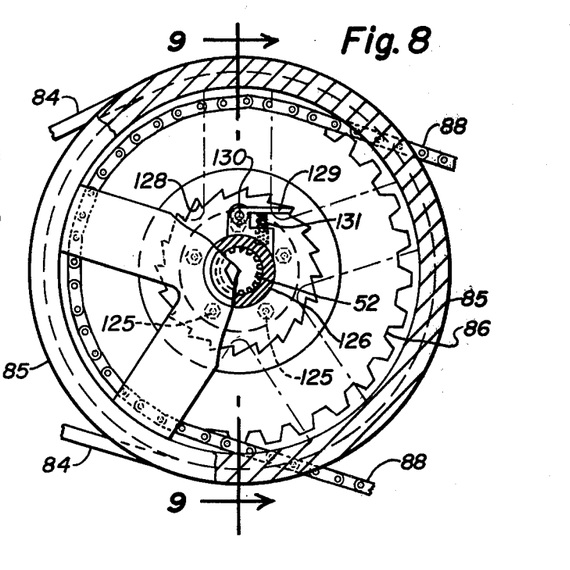
FIG. 8 is an enlarged sectional view taken along the lines 8—8 of FIG. 4 of the main drive shaft imparting rotary motion to the upper apron of the bale forming means and the one way clutch mounted thereabout to disengage the drive to the lower apron or transport means.
Figure 9:
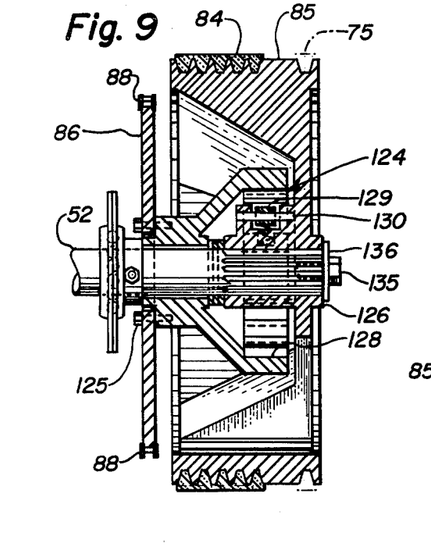
FIG. 9 is a sectional view taken along lines 9—9 of FIG. 8.

Shaft 52 has a one-way clutch 124 mounted about it inwardly of multiply grooved sheave 85. Clutch 124, best shown in FIGS. 8 and 9 is fastened via bolts 125 to the hub 126 of sheave 85. The interior of hub 126 has a pawl or dog 129 fastened to it by pin 130. The pawl is spring biased by compression spring 131 inserted in a suitable slot cast in the hub. The seats within the sheave 85 and has ratcheting 128 circumferentially cast about the entire exterior circumference. The ratcheting 128 cooperates with pawl 129 so that when the sheave 85 is rotated in a counterclockwise direction, the clutch is disengaged and the pawl 129 rides over the ratchets 128. When the sheave 85 turns and rotates in a clockwise direction, the pawl 129 engages ratchet 128 and causes the sprocket 86, which is bolted or pinned to the clutch 124, to correspondingly rotate. The rotation of sprocket 86 causes lower apron chain 88 to be driven and accordingly drives the lower apron 89, briefly shown in FIGS. 1 and 2. The end of shaft 52 is splined and interfits with the splined center of sheave 85. The sheave 85 is securely fastened to the exterior of shaft 52 by a locking bolt 135 and washer 136, or in another suitable fashion.

Alternately, the interior of hub 126 could be composed of ratcheting 128 circumferentially cast about the entire interior circumference of the sheave 85. The ratcheting 128 would then cooperate with the pawl or dog 129 fastened to the clutch by a pin 130. In this configuration the sheave 85 is rotated in a clockwise direction, the clutch would be disengaged and the pawl 129 would ride over the ratchets 128. A driving relationship would exist between the ratcheting 128 and the pawl 129 when the sheave 85 turns in a counterclockwise direction.

In operation the roll forming machine 10 is towed across a field that has arranged thereon in preformed windrows a suitable crop material that has been previously cut. The tined pickup 22 gathers the windrowed crop material, picks it up from the ground and transports it upwardly into the forward portion of the floor 25. The crop material is then transported by the lower apron 89 rearwardly into contact with the moving upper apron 46. The upper apron 46 causes the crop material to be rolled at the rear of the floor 25 in what is commonly called the bale forming region and initiates the formation of a core of crop material. The crop material is continually fed into the bale forming region into an ever increasing cylindrically shaped core. The upper apron 46 expands about the crop roll R as it increases in size by means of the rotation of the takeup means 54 which permits the playing out of more of the upper apron 46 to accommodate the increased bale size. Once the crop roll R has reached the desired size, the operator stops the machine 10 and, if desired, wraps the roll R with a wrapping or binding material. Upon completion of the roll forming and wrapping cycles, the operator elevates the upper frame or tailgate 20 in preparation for discharging the completed crop roll R onto the ground.

Initially while the upper frame 20 is being raised the support arms 98 and 100 maintain sufficient pressure on the idlers 91 and 99 to cause belts 75 and 84 to continue to transfer rotary force. However, beyond first predetermined points in the elevation of the upper frame 20 the lost motion built into the telescoping portion 119 of the support arm 98 has reached its limit and the idler 91 begins to be raised sufficiently to affect the manner in which the transfer of rotary power through the belt 75 is achieved. Similarly, at a second predetermined point in the elevation of upper frame 20 the tension spring 112 reaches its limit of expansion and idler 99 begins to be raised, thereby decreasing the tension on driving belt 84 until it causes the sheave 85 to cease to be driven. This in turn stops the rotation of shaft 52 which is connected to the sprocket 138 which drives the upper apron 46. As the tailgate or upper frame 20 continues to be raised idler 91 on the lower end of support arm 98 is pivoted upwardly and rearwardly about the pivot point of connecting link 93. This pivotal motion of idler 91 in turn causes idler 90 to be pivoted upwardly in a generally clockwise rotation about the pivot pin 96 of idler arm 92. During this entire time rotary drive continues to be transmitted via drive belt 75 from the drive sheave 74 to sheave 76. At the first predetermined point in the elevation of the tailgate or upper frame 20 the idler 91 is pulled sufficiently upwardly and rearwardly to cause the belt 75 to begin to back wrap about the now stationary sheave 84. Once the belt 75 is back wrapped about sheave 85 with sufficient tension, the continued movement of belt 75 imparts a counterclockwise motion to sheave 85, thereby causing the one-way clutch 124 to disengage as pawl 129 passes over the ratcheting 128. Because of the splined connection of sheave 85 to shaft 52, the shaft 52 also rotates in a counterclockwise direction transmitting this rotary drive to the sprocket 138 about which is mounted one of the chains of the upper apron 46. The counterclockwise rotation of the sprocket 138 causes the upper apron 46 to reverse its normal direction of travel, as best shown in FIG. 2, and impart topspin to the completed crop roll R as it urges the roll R out of the roll forming machine's bale forming region. Upon completion of the ejection of the completed crop roll R the upper frame or tailgate 20 is lowered, thereby causing the idlers 99 and 91 to be driven generally downwardly and forwardly into the position generally shown in FIG. 3. As the idler 91 is lowered it causes the belt to lose contact with the sheave 85 and, therefore, allows the upper apron 46 to cease turning in its reverse direction. As the idler 99 is lowered with the closing of the tailgate or upper frame 20, it comes into contact again with belt 84 and supplies sufficient tension to permit the rotary drive force to be transferred from the continuously turning sheave 74 to sheave 85 via the belt 84 so that the sheave 85 drives the shaft 52 in a clockwise direction. This allows the upper apron 46 to be driven in the direction illustrated in FIG. 1.

The drive means 19 shown in the alternative embodiment in FIGS. 11 and 12 functions during operation of the roll forming machine 10 in much the same way as what has just been described. Initially, while the upper frame or tailgate 20 is being raised the support arm 100, with its telescoping portion 114, maintains sufficient pressure through idler 99 on belt 84 to continue the transfer of rotary power between the sheaves 74 and 85. As explained above, beyond the first predetermined point in the elevation of the upper frame 20 the lost motion built in the telescoping portion 114 of support arm 100 reaches its limit and the idler 99 is raised until there is insufficient tension on driving belt 84 to cause the rotation, thereby stopping the drive of the upper apron 46 in its first driven direction. As the tailgate or upper frame 20 is raised, lifting arm 145 moves upwardly thereby causing support arm 139 to pivot about shaft 52 and raise idler 140 on its opposing end. At a second predetermined point in the elevation of the tailgate or upper frame 20 the sheave 140 with its coworking belt 142 is brought into contact with the frictional surface 149 of continuously turning sheave 74. At this point in the elevation of the tailgate 20 the rotary power from shaft 71 is transmitted through sheave 74 to sheave 140 and then to belt 142. The frictional engagement of the surface 149 with the belt 142 and sheave 140 imparts a counterclockwise rotation to belt 142 which in turn causes sheave 44 to drive shaft 52 in the reverse direction. The one way clutch 124 permits shaft 52 to turn without driving the sprocket 132. Thus, the lower apron 89 remains declutched while the upper apron is driven in reverse direction when the tailgate is raised. This reverse travel of the upper apron 46 imparts a topspin to the completed crop roll R, as shown generally in FIG. 2, and causes the bale to automatically be ejected from the roll forming machine 10. During this time the shaft 71 and sheave 76 with its mounted belt 75 are continuously driven.

Thus, during the entire discharge operation of the roll forming machine 10 the operator only has to perform two steps manually. The operator must elevate the tailgate to cause the upper apron to initially cease movement before the upper apron is automatically reversed in its direction of travel to impart topspin to the completed crop roll to eject it. Then the operator must manually actuate the controls to close the tailgate which automatically stops the reverse movement of the upper apron 46 and permits it to be driven in its forward direction prior to recommencing the bale forming operation. There is no need to disengage and then reengage the power takeoff shaft since the power takeoff has been able to operate continuously throughout the entire discharge operation.

While the preferred structure in which the principles of the present invention have been incorporated is shown and described above, it is to be understood that the invention is not to be limited to the particular details thus presented but, in fact, widely different means may be employed in the practice of the broader aspects of this invention. The scope of the appended claims is intended to encompass all obvious changes in the details, materials and arrangements of parts that will occur to one of ordinary skill in the art upon a reading of this disclosure.

Having thus described the invention, what is claimed is:

1. A method for forming crop material rolls from a windrow of preformed crop material in a large roll forming machine having a tailgate movable between an open and a closed position and a roll forming region defined generally by upper bale forming means and conveying means comprising the steps of:
   (a) moving the machine along and across the windrow of crop material;
   (b) picking the crop material up from the windrow and directing it into the roll forming region;
   (c) forming the crop material into a roll of crop material of predetermined length and predetermined diameter;
   (d) wrapping the bale with a binding material about its periphery upon the bales reaching the predetermined diameter;
   (e) raising the tailgate along a predetermined path of travel;
   (f) automatically disengaging the drive to the upper bale forming means as the tailgate is raised along the path of travel to stop the upper bale forming means movement in a first direction and then automatically reversing the movement to a second direction of travel of the upper bale forming means as the tailgate continues to be raised along the path of travel to cause the formed bale to be ejected from the roll forming region;
   (g) lowering the tailgate upon ejection of the bale;
   (h) automatically disengaging the drive to the upper bale forming means as the tailgate is lowered along the path of travel to stop the movement in the second direction of travel and then automatically reversing the movement to the first direction of travel; and
   (i) recommencing movement of the machine along and across the windrow of crop material.

2. The method according to claim 1 comprising the further steps of automatically declutching the conveying means during the path of travel of the tailgate as the tailgate is raised and automatically reengaging the conveying means after the bale is ejected during the path of travel of the tailgate as the tailgate is lowered.

3. A method for forming crop material rolls from a windrow of preformed crop material in a large roll forming machine having a movable tailgate and a roll forming region defined generally by upper bale forming means and conveying means comprising the steps of:
   (a) moving the machine along and across the windrow of crop material;
   (b) picking the crop material up from the windrow and directing it into the roll forming region;
   (c) forming the crop material into a roll of crop material of predetermined length and predetermined diameter by the movement of the upper bale forming means in a first direction of travel;
   (d) automatically wrapping the bale with a binding material about its periphery upon the bale's reaching the predetermined diameter;
   (e) stopping the movement of the machine along and across the windrow of crop material;
   (f) raising the tailgate along a predetermined path of travel between a closed position and a fully raised position upon the bale's being completely wrapped by the binding material;
   (g) automatically disengaging the drive to the upper bale forming means to stop its movement in the first direction of travel at a first predetermined point in the path of travel of the tailgate and then automatically reversing the direction of travel of the upper bale forming means to a second direction of travel at a second predetermined point in the path of travel of the tailgate to cause the formed bale to be ejected from the roll forming region;
   (h) lowering the tailgate along the predetermined path of travel upon ejection of the bale;
   (i) automatically disengaging the drive to the upper bale forming means to stop its movement in the second direction of travel at a third predetermined point in the path of travel of the tailgate and then automatically reversing the travel of the upper bale forming means to the first direction of travel at a fourth predetermined point in the path of travel of the tailgate; and
   (j) recommencing movement of the machine along and across the windrow of crop material.

4. The method according to claim 3 comprising the further steps of automatically declutching the conveying means at a fifth predetermined point in the path of travel as the tailgate is raised and automatically reengaging the conveying means at a sixth predetermined point in the path of travel of the tailgate as the tailgate is lowered.

5. A method of ejecting a completed crop roll from a roll forming machine having a movable tailgate and a roll forming region defined by bale forming means and conveying means comprising the steps of:
   (a) raising the tailgate through a predetermined path of travel;
   (b) automatically stopping at a first predetermined point along the path of travel of the tailgate the movement of the bale forming means in a first direction of travel along a second predetermined path about the roll forming region;
   (c) automatically recommencing the movment of the bale forming means at a second predetermined point along the path of travel of the tailgate in an opposing second direction of travel along the second predetermined path about the roll forming region to eject the formed bale of crop material; and
   (d) lowering the tailgate.

6. The method of ejecting a completed crop roll from a roll forming machine having a tailgate movable between a raised open position and a lowered closed position and a roll forming region defined by bale forming means and conveying means comprising the steps of:
   (a) raising the tailgate through a predetermined path of travel;
   (b) stopping at a first predetermined point along the path of travel of the tailgate the movement of the bale forming means in a first direction of travel along a predetermined path about the roll forming region;

(c) recommencing the movement of the bale forming means at a second predetermined point along the path of travel of the tailgate in an opposing second direction of travel along the predetermined path about the roll forming region to eject the formed bale of crop material; and (d) lowering the tailgate.

* * * * *